United States Patent
Stapleton et al.

(10) Patent No.: US 12,481,854 B1
(45) Date of Patent: Nov. 25, 2025

(54) SYSTEMS AND METHODS FOR SECURE UTILIZATION OF QUICK RESPONSE CODES

(71) Applicant: Wells Fargo Bank, N.A., San Francisco, CA (US)

(72) Inventors: Jeff J. Stapleton, O'Fallon, MO (US); Richard Toohey, Madison, WI (US); Peter Bordow, Fountain Hill, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 117 days.

(21) Appl. No.: 18/052,821

(22) Filed: Nov. 4, 2022

Related U.S. Application Data

(60) Provisional application No. 63/265,469, filed on Dec. 15, 2021.

(51) Int. Cl.
*G06K 19/06* (2006.01)
*H04L 9/08* (2006.01)

(52) U.S. Cl.
CPC ...... *G06K 19/06018* (2013.01); *H04L 9/0858* (2013.01)

(58) Field of Classification Search
CPC ........ G06F 21/36; G06F 21/64; G06F 21/604; G06F 21/602; H04L 9/3247; H04L 9/0822; H04L 9/0825
See application file for complete search history.

(56) References Cited

U.S. PATENT DOCUMENTS

| | | | | |
|---|---|---|---|---|
| 10,411,894 | B1* | 9/2019 | Yavnilovich | H04W 12/06 |
| 11,930,105 | B1* | 3/2024 | Stapleton | H04L 63/0869 |
| 2019/0306134 | A1* | 10/2019 | Shanbhogue | H04L 63/123 |
| 2023/0101005 | A1* | 3/2023 | Byington | G06F 21/604 |
| | | | | 726/17 |
| 2023/0101347 | A1* | 3/2023 | Byington | G06F 21/36 |
| | | | | 726/17 |

OTHER PUBLICATIONS

Why QR codes are on the rise, The Economist, https://www.economist.com/the-economist-explains/2017/11/02/Why-qr-codes-are-on-the-rise, Nov. 2, 2017.
Meltem Sonmez Turan, et al., Recommendation for the Entropy Sources Used for Random Bit Generation, NIST Special Publication 800-90B, Jan. 2018.
Quick Resource: EMV® QR Code™ for Payments https://www.emvco.com/document-search/?action=search_documents&publish_date=&emvco_document_version=&emvco_document_book=&px_search=&emvco_document_technology%5B%5D=qr-code.
(Continued)

*Primary Examiner* — Mirza F Alam
(74) *Attorney, Agent, or Firm* — K&L Gates LLP

(57) ABSTRACT

Systems, apparatuses, methods, and computer program products are disclosed for secure utilization of quick response (QR) codes. An example method includes obtaining a key known to the initiating device and a participating device, and identifying, by QR code processing circuitry of the initiating device, a payload to be encoded in a QR code. The example method further includes generating, by security circuitry of the initiating device and based on the payload and the key, a secure character string, creating, by the QR code processing circuitry of the initiating device, the QR code using the secure character string, and outputting the QR code by the communications hardware of the initiating device.

20 Claims, 12 Drawing Sheets

(56) References Cited

OTHER PUBLICATIONS

Charles H. Bennett and Gilles Brassard (1984), Quantum cryptography: Public key distribution and coin tossing. In Proceedings of IEEE International Conference on Computers, Systems and Signal Processing, vol. 175, p. 8. New York, 1984.
Ekert, Artur K., Quantum cryptography based on Bell's theorem Physical Review Letters. 67 (6): 661-663, Aug. 5, 1991.
Richard Moulds (Whitewood), Richard Hughes (Los Alamos National Laboratory), Random Number Generation Is Getting Harder—It's Time to Pay Attention, RSA 2017 Conference, PDAC-F03, Feb. 2017.
NIST Special Publication 800-57 Part 1 Revision 5, Recommendation for Key Management: Part 1—General, May 2020.
PKCS [Public Key Cryptography Standard] #5: Password-Based Cryptography Specification Version 2.1, Jan. 2017.
P. Eronen, H. Tschofenig, Pre-Shared Key Ciphersuites for Transport Layer Security (TLS), Dec. 2005.
M. Badra, Pre-Shared Key Cipher Suites for TLS with SHA-256/ 384 and AES Galois Counter Mode, Mar. 2009.
Em. Badra, I. Hajjeh, ECDHE_PSK Cipher Suites for Transport Layer Security (TLS), Mar. 2009.
Information Technology—Automatic identification and data capture techniques—QR Code bar code symbology specification https:// www.iso.org/standard/62021.html, First Edition Jun. 15, 2000.
NIST FIPS 186-4 Digital Signature Standard (DSS) https://csrc. nist.gov/publications/detail/fips/186/4/final, Jul. 2013.

\* cited by examiner

SYSTEMS AND METHODS FOR SECURE UTILIZATION OF QUICK RESPONSE CODES

CROSS-REFERENCE TO RELATED APPLICATIONS

This application claims benefit to U.S. Provisional Patent Application No. 63/265,469, filed Dec. 15, 2021, the entire contents of which are incorporated herein by reference.

BACKGROUND

Barcodes are representations of data in a visual machine-readable medium. Early implementations were one-dimensional barcodes that represent data by varying the widths and spacing between of a series of parallel lines. Matrix barcodes (or two-dimensional) barcodes were later developed that use other shapes, such as rectangles, dots, and the like. Quick Response (QR) codes are a type of matrix barcode (or two dimensional barcode) standardized per ISO/IEC 18004. QR codes have become popular due to fast readability and greater storage capacity than standard one dimensional barcodes, and they can easily be scanned from both paper and a screen. QR codes are used in an increasingly broad variety of settings, such as for product tracking, item identification, time tracking, document management, general marketing, and even to facilitate payments.

BRIEF SUMMARY

In a typical scenario, a user may interact with a QR code using a computing device, such as a smartphone. The user will capture an image of the QR code using the smartphone's camera, and the smartphone will process the captured image using the Reed-Solomon error correction until the image can be appropriately interpreted. Subsequently, the smartphone will extract the data represented by the QR code in the image and process it accordingly (such as to generate a URL to which a web browser on the smartphone will navigate).

QR codes have traditionally been used for benign applications, such as to provide descriptive information about a product, or to navigate a user's smartphone to the menu for a restaurant. However, because QR codes are considered for more sensitive use cases, such as in financial transactions, the inventors have realized that applications of QR codes typically lack any sort of security or authentication procedures, which presents a significant risk to participants who may be asked to utilize QR codes for those financial transactions.

To reduce the likelihood of unauthorized parties manipulating interactions using QR codes, systems, apparatuses, methods, and computer program products are disclosed herein for QR code authentication. This authentication may be provided using truly random numbers known only to a source entity that generates a QR code and a destination entity that, ultimately, authenticates the QR code. Example embodiments described herein thus provide a technical improvement and advantage over previous uses of QR codes by enabling the destination entity to confirm whether a QR code originated from a trusted source entity, thereby increasing ultimate trust and security of any transactions facilitated using the QR code.

In another example embodiment, a method is provided for an initiating device to securely use QR codes. The method includes obtaining a key known to the initiating device and a participating device, and identifying, by QR code processing circuitry of the initiating device, a payload to be encoded in a QR code. The method further includes generating, by security circuitry of the initiating device and based on the payload and the key, a secure character string, creating, by the QR code processing circuitry of the initiating device, the QR code using the secure character string, and outputting the QR code by the communications hardware of the initiating device.

In one example embodiment, an apparatus comprising an initiating device is provided for securely using QR codes. The apparatus includes communications hardware configured to obtain a key known to the initiating device and a participating device, and QR code processing circuitry configured to identify a payload to be encoded in a QR code. The apparatus further includes security circuitry configured to generate, based on the payload and the key, a secure character string, wherein the QR code processing circuitry is further configured to create the QR code using the secure character string, and wherein the communications hardware is further configured to output the QR code.

In another example embodiment, a computer program product is provided for an initiating device to securely use QR codes. The computer program product includes at least one non-transitory computer-readable storage medium storing software instructions that, when executed, cause an initiating device to obtain a key known to the initiating device and a participating device, and identify a payload to be encoded in a QR code. The software instructions, when executed, further cause the initiating device to generate, based on the payload and the key, a secure character string, create the QR code using the secure character string, and output the QR code.

In another example embodiment, a method is provided for a participating device to securely use QR codes. The method includes obtaining, by communications hardware of a participating device, a key known to an initiating device and the participating device, and receiving, by the participating device, an indication of a secure character string extracted from a QR code. The method further includes verifying, by security circuitry of the participating device and using the key, authenticity of the QR code, and in response to verifying the authenticity of the QR code, perform, by the participating device, an action set.

In another example embodiment, an apparatus comprising a participating device is provided for securely using QR codes. The apparatus includes communications hardware configured to obtain a key known to an initiating device and the participating device, security circuitry configured to verify, using the key, authenticity of a QR code received by the participating device, and processing circuitry configured to perform an action set in response to verifying the authenticity of the QR code.

In another example embodiment, a computer program product is provided for a participating device to securely use QR codes. The computer program product includes at least one non-transitory computer-readable storage medium storing software instructions that, when executed, cause the participating device to obtain a key known to an initiating device and the participating device, and receive an indication of a secure character string extracted from a QR code. The software instructions, when executed, further cause the participating device to verify, using the key, authenticity of the QR code, and in response to verifying the authenticity of the QR code, perform an action set.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for QR code authentication. QR codes have traditionally been used for benign applications, such as to provide descriptive information about a product, or to navigate a user's smartphone to the menu for a restaurant. However, because QR codes are considered for more sensitive use cases, such as in financial transactions, the inventors have realized that applications of QR codes typically lack any sort of security or authentication procedures, which presents a significant risk to participants who may be asked to utilize QR codes for those financial transactions.

Figure 1A:
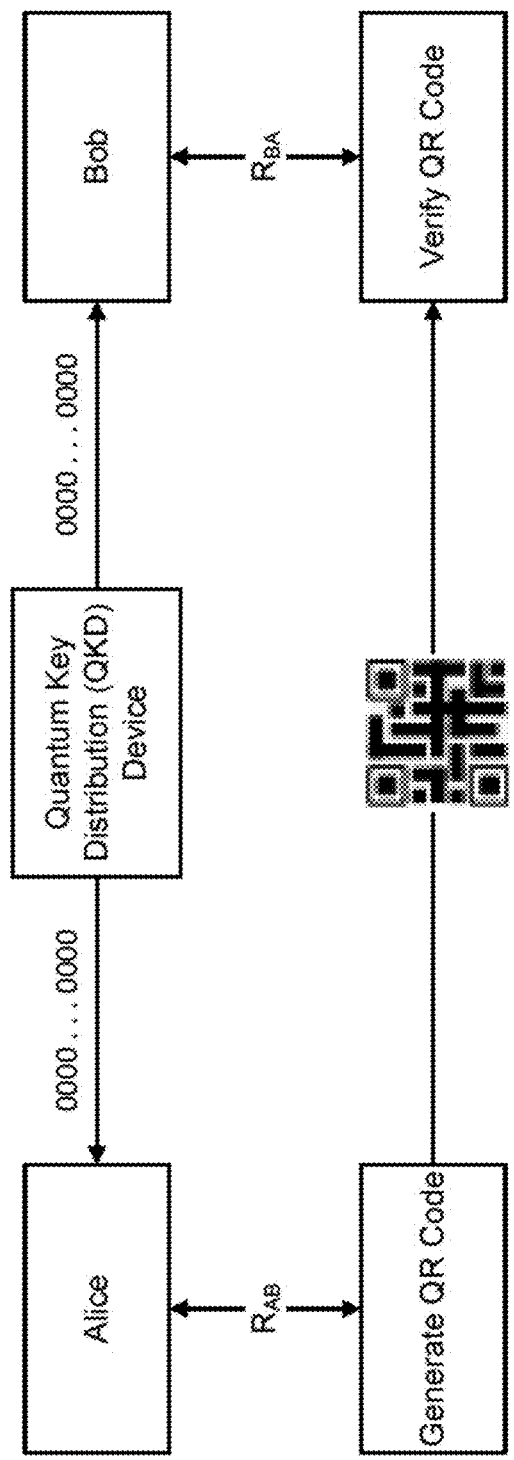
FIG. 1A illustrates a high level diagram of some example embodiments for securing QR codes between an initiating device and a participating device using quantum random numbers.

To enable the use of QR codes with enhanced security, example embodiments provide for secure utilization of QR codes using truly random numbers known only to an initiating device that generates a QR code and a participating device that authenticates the QR code. Example implementations rely on the exchange of a shared secret (i.e., a key) between Alice and Bob. One example implementation by which this key may be exchanged is shown in FIG. 1A, in which two parties (e.g., Alice and Bob) use quantum key distribution (QKD) to establish a random number for authentication. Alice receives entangled particles from the QKD device, measures the entangled particles to derive a random number, generates a QR code that includes the random number, and provides the QR code to Bob. Bob receives entangled particles from the same QKD device, measures the entangled particles to derive the same random number, reads the QR code from Alice, and verifies that the random numbers match. Thus, Alice or any third party getting the QR code from Alice can authenticate to Bob.

Alice might send the QR code to Bob embedded within a message for various applications, such as product tracking, item identification, time tracking, document management, general marketing, or even payment. Bob can verify that the QR code originated from Alice. Alice might provide the QR code to a third party, and the third party might send the QR code to Bob, who can verify that the QR code originated from Alice. Alice might provide the QR code to a third party, the first third party might send the QR code to another third party, and the second third party might send the QR code to Bob, who again can verify the QR code originated from Alice.

In some implementations, the key need not be a random number generated via entangled particles, but may be a key generated and exchanged between Alice and Bob using other techniques (e.g., public key encryption, non-entanglement based QKD solutions, or the like). In such implementations, Alice may then generate the QR code based on the key, and Bob may verify authenticity of the QR code using the key.

Example embodiments described herein thus provide a technical improvement and advantage over previous uses of QR codes by enabling a participating device (e.g., Bob) to confirm whether a QR code originated from a trusted source entity (e.g., Alice), thereby increasing security of any actions subsequently facilitated by the QR code.

Although a high level explanation of the operations of example embodiments has been provided above, specific details regarding the configuration of such example embodiments are provided below.

System Architecture

Figure 1B:
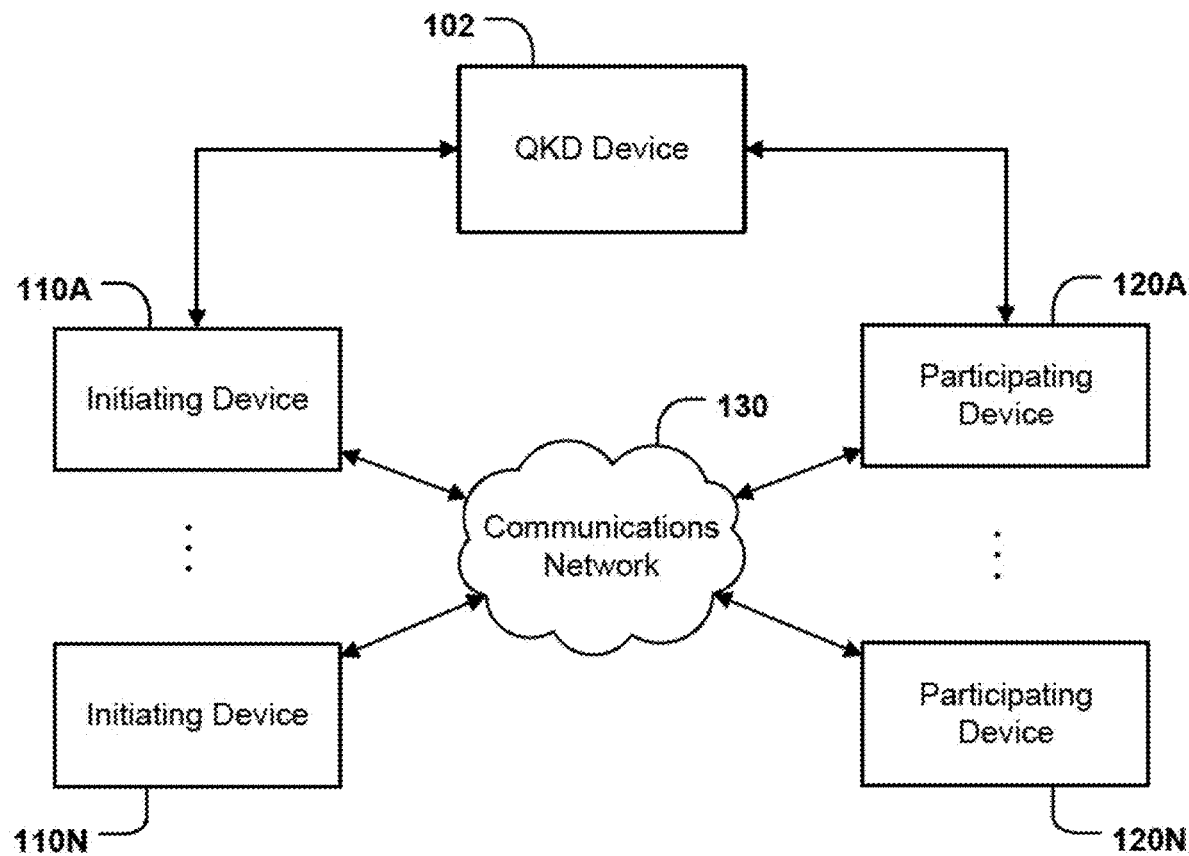
FIG. 1B illustrates a system in which some example embodiments may be used for securing QR codes between an initiating device and a participating device using quantum random numbers.

Example embodiments described herein may be implemented using any number and type of computing devices. To this end, FIG. 1B illustrates an example environment within which various embodiments may operate. As illustrated, the environment may include any number of initiating devices 110A-110N and participating devices 120A-120N. These devices may interact with one another to perform any number and types of services, including the exchange of QR codes. Moreover, when a participating device receives a QR code generated by the initiating device in accordance with example embodiments, the participating device may verify authenticity of the QR code (e.g., verify that the QR code was generated by the initiating device and, in some embodiments, whether any controls associated with the QR code are satisfied). As used herein, the term initiating device refers to a device that generates a QR using a secure character string that can be authenticated by another device (e.g., a participating device). Likewise, the term participating device refers to a device that can authenticate a QR code generated by the initiating device. Any device may be an initiating device and/or a participating device (for example, a device may both be in the process of authenticating another device's QR code while also generating a QR code that may be authenticated by yet another device) depending on its role in a given interaction, which may change over time.

The initiating devices 110A-110N may be implemented using any number (one, many, etc.) or type of computing devices known in the art, such as desktop or laptop computers, tablet devices, smartphones, or the like. The initiating devices may be associated with corresponding users (e.g., administrators, customers, representatives, other persons, etc.) that use the initiating devices 110A-110N to interact with one or more of the participating devices 120A-120N.

The users and/or applications hosted by the initiating devices may securely transmit QR codes to the participating devices 120A-120N when interacting with them (and/or other devices). The QR codes may be any QR codes currently in use today, as the secure transmission of QR codes described herein does not disrupt the underlying mechanics of the QR code creation and/or interpretation processes themselves.

The participating devices 120A-120N may be implemented using any number or type of computing devices known in the art, such as desktop or laptop computers, tablet devices, smartphones, or the like. The participating devices 120A-120N may provide computer implemented services to and/receive computer implemented services from the initiating devices 110A, 110N and/or other devices, and may verify authenticity of any QR code received by a particular one of the initiating devices 110A-110N.

Like the initiating devices 110A-110N, the participating devices 120A-120N may be associated with corresponding users (e.g., administrators, customers, representatives, other persons, etc.) that use the participating devices 120A-120N to interact with one or more of the initiating devices 110A-110N (and/or other devices).

The initiating devices 110A-110N and the participating devices 120A-120N may cooperatively provide various computer implemented services to accomplish desirable goals for their respective users. For example, consider a scenario in which an initiating device is being used by a customer to communicate with a merchant. The customer may desire to make a payment at the merchant's retail location, and may open an app on the customer's device (the initiating device in this example) to generate and display a QR code encoding payment credentials of the customer's chosen method of payment. The initiating device may generate the QR code using a key (e.g., a quantum random number (QRN) or some other shared secret) known only to the initiating device and a participating device hosted by the merchant. A cashier at the retail location of the merchant may utilize a retail device to scan the QR code on the initiating device, which may then be relayed to the participating device for authentication. Upon the participating device authenticating the QR code, the participating device may relay a message verifying authenticity of the QR code and approve the retail device moving ahead with processing of payment using the payment credentials encoded in the QR code.

To reduce the likelihood that unintended recipients fraudulently transmit or receive information using QR codes, embodiments disclosed herein may provide for the performance of protective actions by introducing security into the QR code encoding/decoding process.

In some embodiments, initiating devices 110A-110N and/or participating devices 120A-120N do not include functionality to generate keys utilized in the generation of the QR code. For example, some or all of these devices may not include hardware necessary to generate a QRN. Rather than having to generate the QRN themselves, these devices may interact with a separate QKD device 102 to generate the QRNs.

To this end, the QKD device 102 may be implemented using any number (one, many, etc.) or type of computing devices known in the art, such as desktop or laptop computers, tablet devices, smartphones, or the like. The QKD device 102 may provide for the secure distribution of entangled particles (or, in some embodiments, true random numbers) to initiating devices 110A-110N and participating devices 120A-120N. By doing so, any number of initiating devices 110A-110N and participating devices 120A-120N may implement embodiments described herein using true random numbers.

To facilitate communications, any of the devices shown in FIG. 1B may be operably connected to each other with communications network 130. Communications network 130 may facilitate communications with one or more wired and/or wireless networks implemented using any suitable communications technology. In one embodiment, communications network 130 includes any number and type of transmission channels (e.g., electrical cabling, optical cabling, free space channels, etc.) through which signals (e.g., electrical, optical, etc.) on which data is encoded are distributed amongst the devices. The communications network 130 may be implemented using any number and type of communication protocols.

Although FIG. 1B illustrates an environment and implementation in which various functionalities are performed by different devices, in some embodiments some or all of the functionalities of the initiating devices 110A-110N, participating devices 120A-120N, and QKD device 102, are aggregated into a single device.

Example Implementing Apparatuses

Figure 2A:
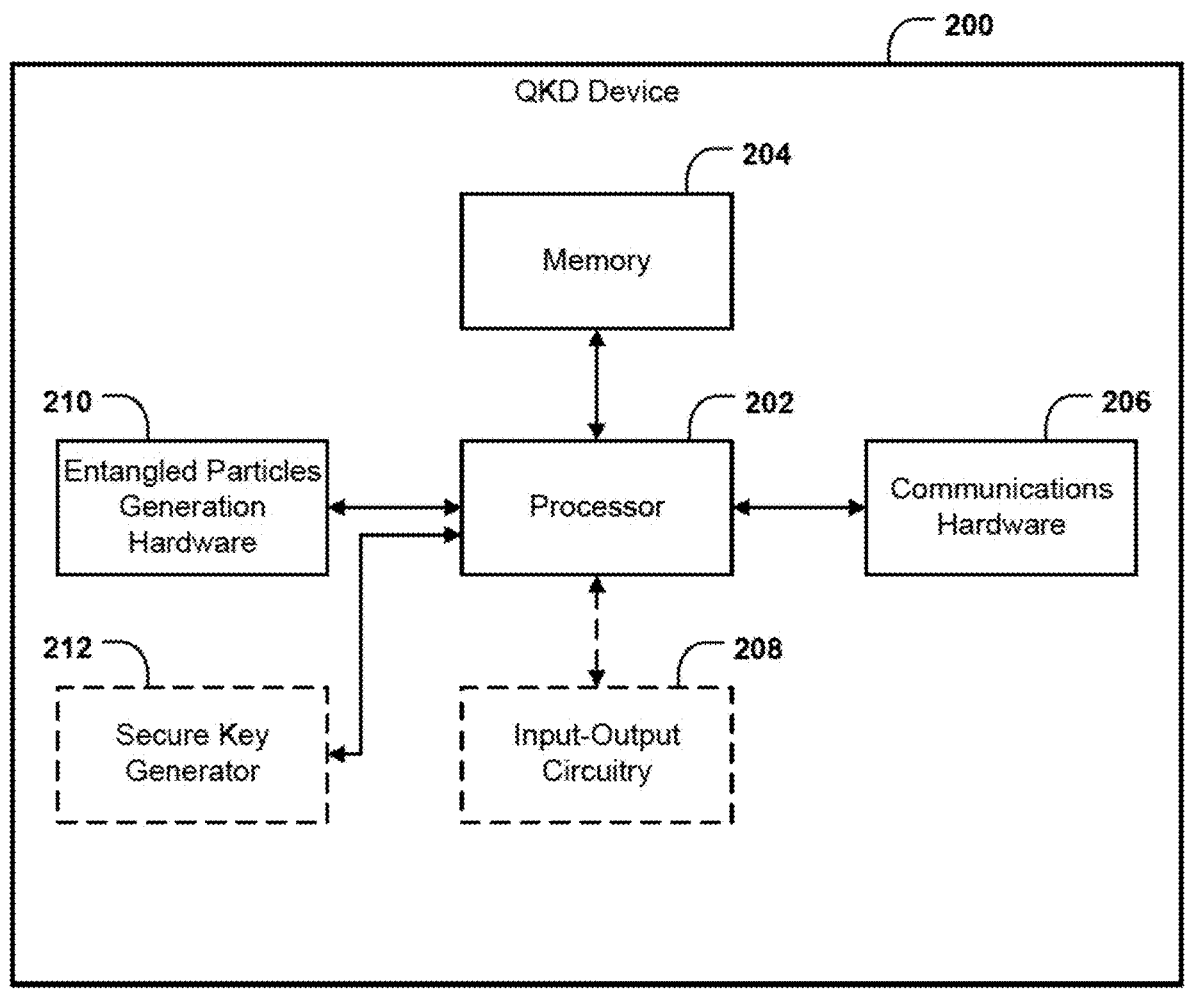
FIGS. 2A-2D illustrates a schematic block diagram of example circuitry embodying a quantum key distribution device that may perform various operations in accordance with some example embodiments described herein.

The QKD device 102 (described previously with reference to FIGS. 1A and 1B) may be embodied by one or more computing devices, shown as apparatus 200 in FIG. 2A. As illustrated in FIG. 2A, the apparatus 200 may include processor 202, memory 204, communications hardware 206, input-output circuitry 208, and entangled particles generation hardware 210, each of which will be described in greater detail below. While the various components are only illustrated in FIG. 2A as being connected with processor 202, it will be understood that the apparatus 200 may further comprises a bus (not expressly shown in FIG. 2A) for passing information amongst any combination of the various components of the apparatus 200. The apparatus 200 may be configured to execute various operations described above in connection with FIGS. 1A and 1B, and below in connection with FIGS. 5-7C.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means suitable for transmitting entangled particles, such as a device or circuitry embodied in either hardware or a combination of hardware and software that is configured to receive and/or transmit data from/to any other device, circuitry, or module in communication with the apparatus 200 (e.g., any initiating devices 110A-110N and/or participating devices 120A-120N). In this regard, the communications hardware 206 may include, for example, interfaces for enabling communications with other devices, such as one or more ports (e.g., a laser port, a fiber-optic cable port, and/or the like).

In some embodiments, the communications hardware 206 is designed to inject quantum data (e.g., entangled particle(s) or secure key(s)) into another device (e.g., any of initiating devices 110A-110N and participating devices 120A-120N). The communications hardware 206 may utilize processor 202, memory 204, and other hardware components included in the apparatus 200 to perform these operations, as described in connection with FIGS. 2D and 5-7C below. The communications hardware 206 may further gather data from a variety of sources (e.g., a separate storage device, entangled particles generation hardware 210, or the like), may utilize input-output circuitry 208 to receive data from a user, and in some embodiments may utilize a transmission medium to inject quantum data into various devices, or otherwise cause transmission of various data.

Figure 2B:
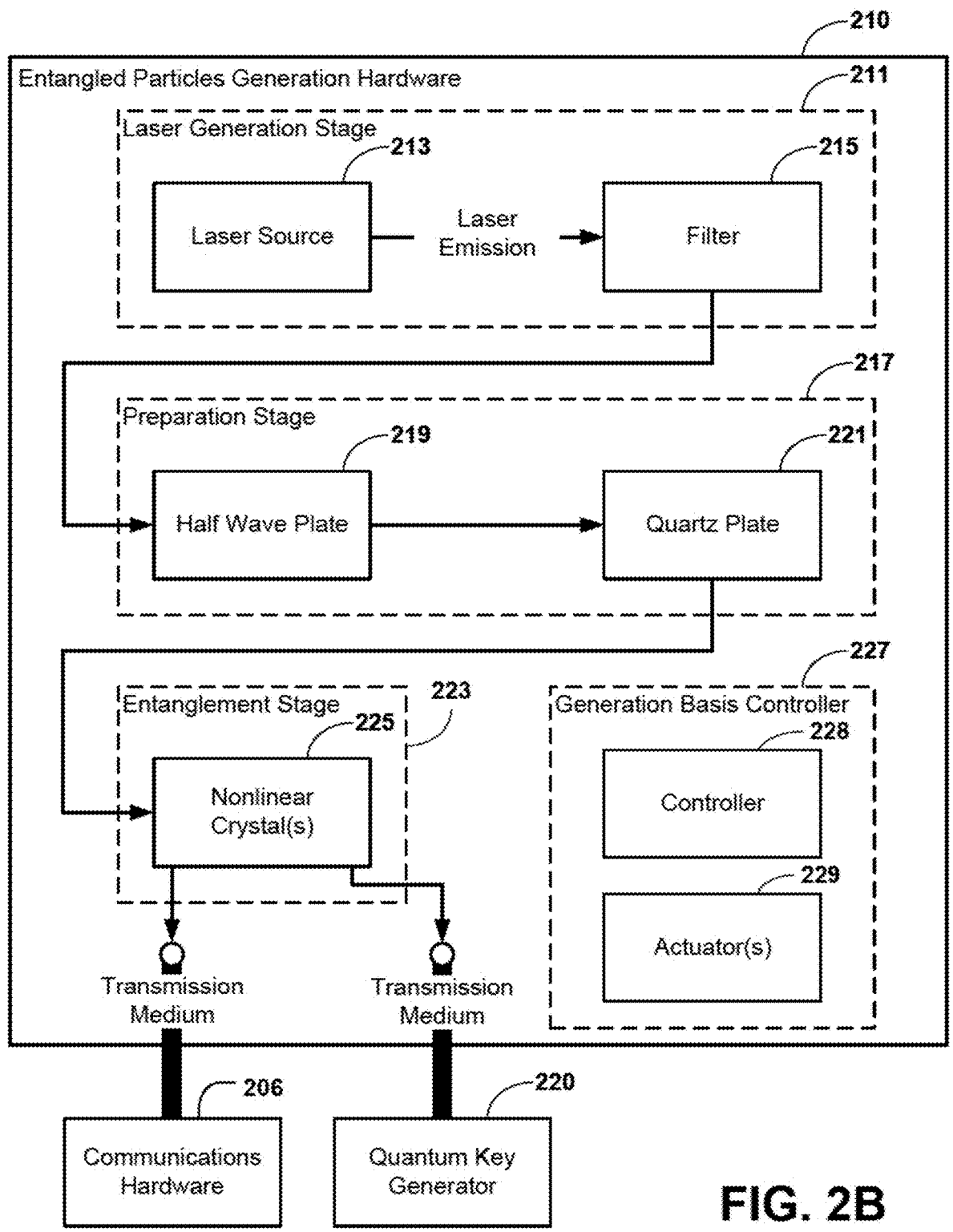
Figure 2C:
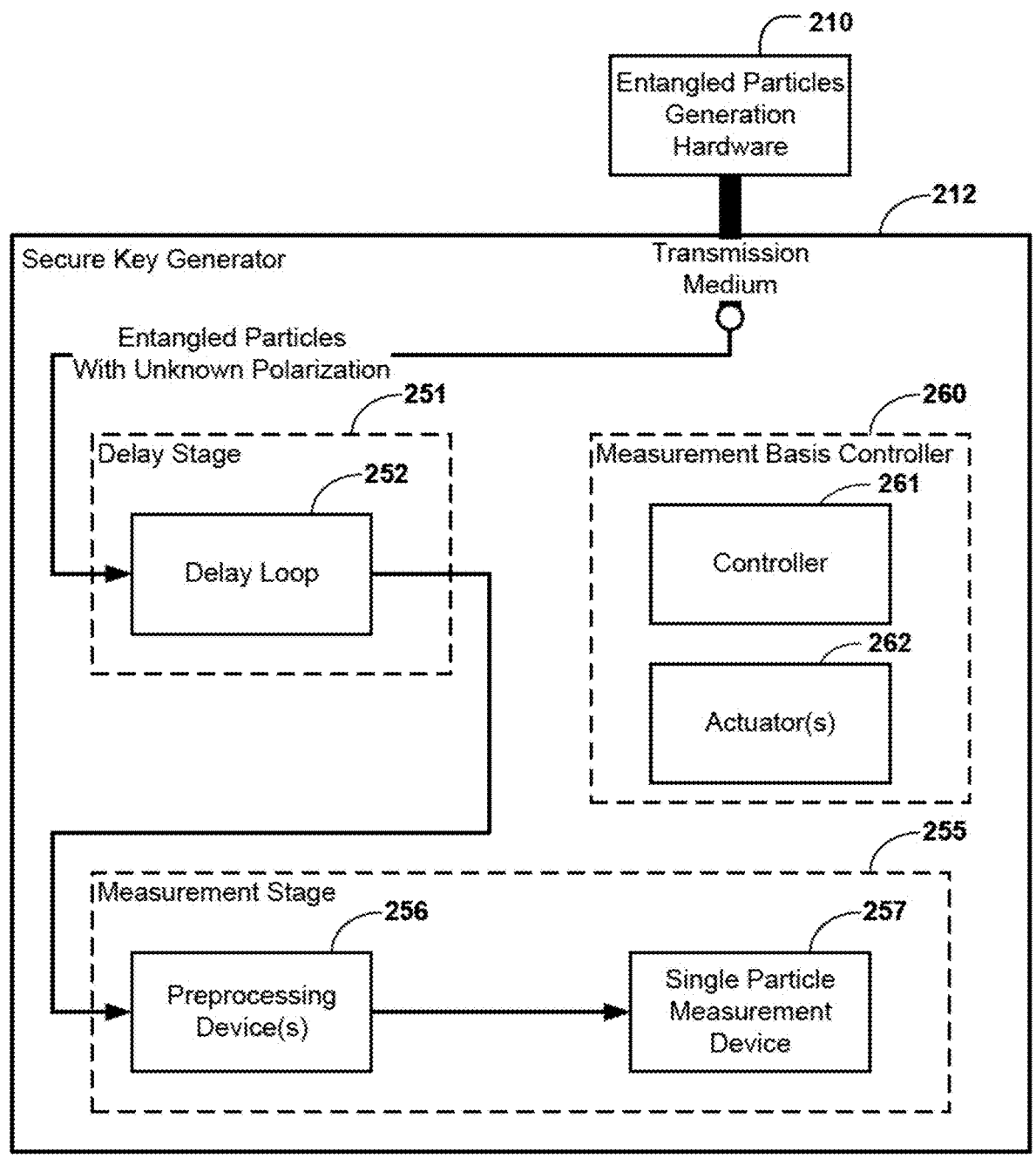
Figure 2D:
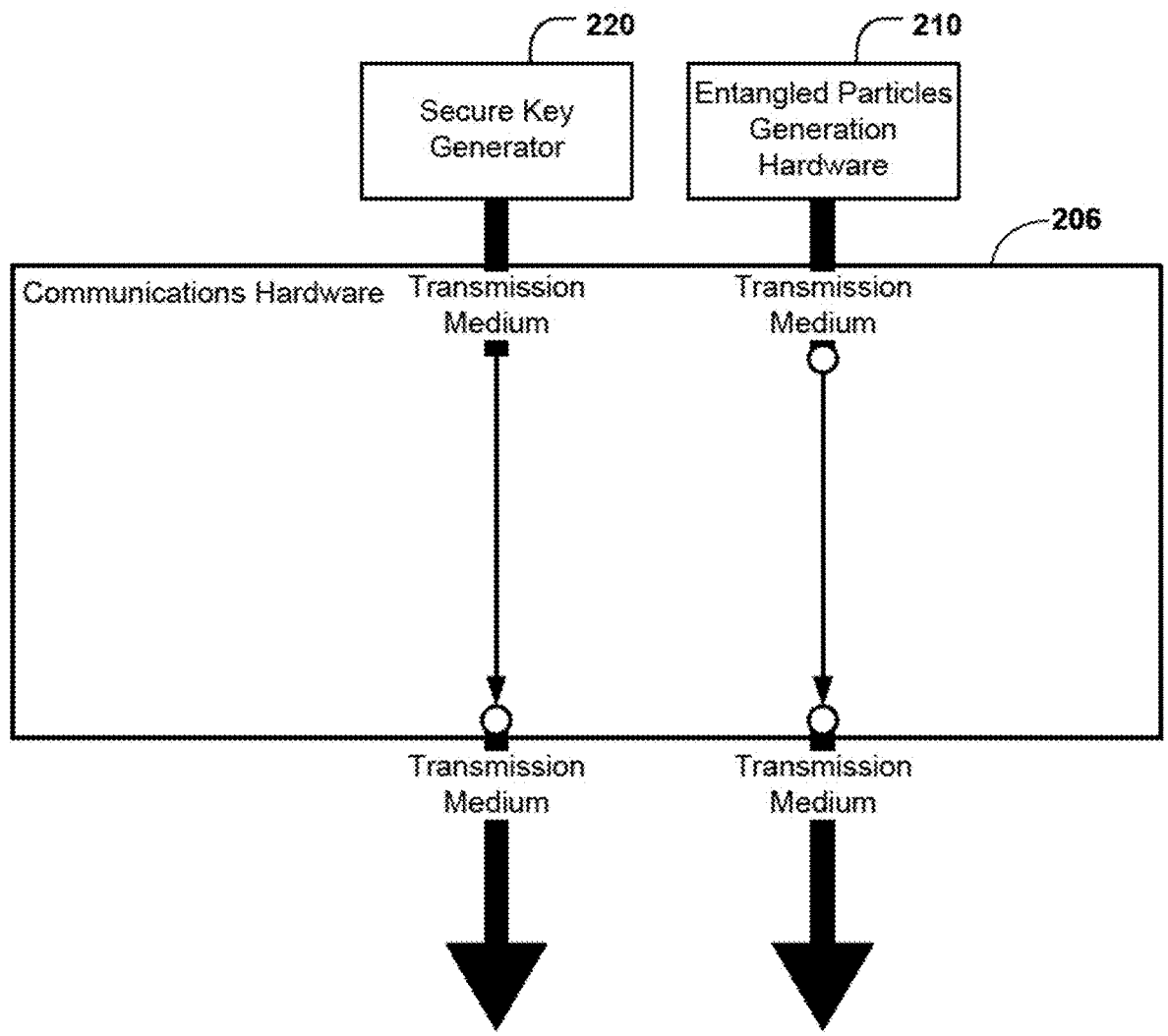

Further, communications hardware 206 may include devices for simultaneous transmission of entangled particles from the entangled particles generation hardware 210 and carrier signals on which data (which may include sensitive data, such as metadata relating to the generation of quantum data such as timestamps and/or the like) is encoded on a transmission medium such as an optical fiber, free space, laser, or other medium. Refer to FIG. 2D for additional details regarding communications hardware 206.

The apparatus 200 may include input-output circuitry 208 configured to provide output to a user and, in some embodiments, to receive an indication of user input. It will be noted that some embodiments will not include input-output circuitry 208, in which case user input may be received via a separate device such as an initiating device 110A-110N and/or participating device 120A-120N (shown in FIG. 1B). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises entangled particles generation hardware 210 that generates pairs of entangled particles. The entangled particles generation hardware 210 may utilize processor 202, memory 204, or any other hardware component included in the apparatus 200 to perform these operations, as described in connection with FIGS. 4-6 below. The entangled particles generation hardware 210 may further utilize communications hardware 206 to gather data from a variety of sources (e.g., a separate storage device), may utilize input-output circuitry 208 to receive data from a user, and in some embodiments may utilize processor 202 and/or memory 204 to generate pairs of entangled particles. Refer to FIG. 2B for additional details regarding entangled particles generation hardware 210.

In addition, the apparatus 200 may further comprise a secure key generator 212 that generates a secure key. The secure key generator 212 may utilize processor 202, memory 204, or any other hardware component included in the apparatus 200 to perform these operations, as described in connection with FIGS. 5-7C below. The secure key generator 212 may further utilize communications hardware 206 to gather data from a variety of sources (e.g., a separate storage device), may utilize input-output circuitry 208 to receive data from a user, and in some embodiments may utilize processor 202 and/or memory 204 to measure entangled particles and generate a key based on the measurement of the entangled particles. The secure key generator 212 may be any means such as one or more devices or circuitry embodied in either hardware or a combination of hardware and software that is configured to measure entangled particles and generate secure keys. The secure key generator 212 may measure entangled particles to create true random numbers, which can thereafter be transmitted to devices (which thereby obtain copies of true random number sequences). The entangled particles may be generated by the entangled particles generation hardware 210 and/or other devices. Refer to FIG. 2C for additional details regarding secure key generator 212. The secure key generator 212 may in some implementations generate secure keys in other ways that do not rely on the use of entangled particles. For instance, secure key generator 212 may generate random numbers using other techniques or may alternatively generate and use pseudorandom numbers in place of random numbers. Further, secure key generator 212 may use any number of key generation procedures that may or may not rely upon the use of true random numbers (e.g., public key encryption, non-entanglement based QKD solutions, or the like).

Turning to FIG. 2B, a diagram of an example entangled particles generation hardware 210 is illustrated. As noted above, entangled particles generation hardware 210 may provide for the generation of pairs of particles (e.g., photons) that are entangled. Once generated, the entangled particle pairs may be injected into corresponding devices (e.g., one of initiating devices 110A-110N and a corresponding one of participating devices 120A-120N). To provide this functionality, entangled particles generation hardware 210 may include a laser generation stage 211, a preparation stage 217, an entanglement stage 223, and a generation basis controller 227. Each of these components is discussed below.

The laser generation stage 211 may be any means such as a device that is configured to generate and/or condition a laser emission. The laser generation stage 211 may include a laser source 213 and a filter 215. The laser source 213 may generate a laser emission (e.g., coherent optical radiation). The laser source 213 may be any type of laser generating device (e.g., a gas laser, chemical laser, excimer laser, solid-state laser, fiber laser, photonic crystal laser, etc.) The filter 215 may be a physical device (e.g., a laser line filter) to optically filter the laser emission selectively for a predetermined frequency. The laser source 213 and filter 215 may be aligned with one another along a transmission path of the laser emission.

The preparation stage 217 may be any means such as a device that is configured to prepare a laser emission for generation of entangled particles. The preparation stage 217 may include a half wave plate 219 and a quartz plate 221. These devices may be positioned along the transmission path of the laser emission to condition the polarization of the laser, remove unwanted spectral components, collimate the laser emission, and/or otherwise prepare the laser emission for impingement on a nonlinear crystal or other structure for entangled photon pair generation.

The entanglement stage 223 may be any means such as a device that is configured to generate entangled photons with a laser emission. In one or more embodiments, the entanglement stage 223 is configured to generate entangled particle pairs having a polarization relationship. However, the entangled particles may have other relationships (e.g., energy, time, etc.). The polarization relationship may require, for example, that each entangled particle of the entangled particle pairs have a same or different polarization with respect to the other entangled particle of the respective entangled particle pairs. When generated, the pairs of entangled particle may be in an indeterminate state (e.g., unmeasured).

The entanglement stage 223 may include one or more nonlinear crystals 225 positioned in the optical path along which the laser emission travels. The non-linear crystals 225 may be configured to induce spontaneous parametric down-conversion of the laser to generate the entangled particle pairs. The entangled particle pairs may have a type II polarization correlation (e.g., a polarization relationship) and may be constrained with known trajectories from the non-linear crystals 225 such that the resulting entangled particles of each pair may be directed along different optical paths. Each of the optical paths may be aligned with respective transmission mediums to direct one of the entangled particles of each entangled particle pair to the communications hardware 206 and, in some embodiments, the other entangled photon of each entangled photon pair to the secure key generator 220, a storage device, and/or the like. The nonlinear crystals 225 may be formed from any suitable material such as, for example, beta-barium borate, lithium niobate, or other material. The transmission mediums may be, for example, optical fibers, free space, or other structures. The resulting entangled particle pairs may be in an indeterminate polarization state upon generation and the distribution of the resulting polarization states of the entangled particle pairs, once measured, may be truly random by virtue of the generation process.

The generation basis controller 227 may be any means such as a device that is configured to modify the basis used to generate the entangled particle pairs. To appropriately measure the entangled particle pairs, information regarding the generation basis may need to be known. The generation basis controller 227 may include, for example, a controller 228 and one or more actuators 229. The actuators 229 may be positioned to modify the positioning and/or orientation of the half wave plate 219, quartz plate 221, nonlinear crystals 225, and/or transmission mediums with respect to one another. The actuators 229 may be operably connected to the controller 228 such that the controller 228 may operate the actuators 229 to modify the positioning and/or orientation of the aforementioned components.

Turning to FIG. 2C, a diagram of an example secure key generator 212 is illustrated. As noted above, the secure key generator 212 may facilitate measurement of one entangled particle (e.g., photon) of each entangled particle pair generated by the entangled particles generation hardware 210. Measuring one of the entangled particles for each of the entangled particle pairs may produce true random numbers (e.g., a secure key), which can then be provided to a device (e.g., an initiating device 110A-110N and/or a participating device 120A-120N). When entangled particles are received by the secure key generator 212, the polarization of the particles may be indeterminate and/or unknown to the apparatus 200. To measure entangled particles, the secure key generator 212 may include a delay stage 251, measurement stage 255, and measurement basis controller 260. Each of these components is discussed below.

The delay stage 251 may be any means such as a device that is configured to delay arrival of entangled particles at a measurement device. The delay may be configured to, for example, prevent entangled particle pairs from being measured by the measurement device (prior to measurement of one entangled particle by another device) or to set a timing of when one entangled particle of an entangled particle pair is measured. The delay stage 251 may include a delay loop 252 (e.g., a string of optical fiber, a free space transmission path bounded with mirrors, etc.). The delay loop may be optically coupled to a transmission medium to receive entangled particles from the entangled particles generation hardware 210. Similarly, the delay loop may be optically coupled to another transmission medium to permit distribution of entangled particles to communications hardware 206 for injection into a device (e.g., any of initiating devices 110A-110N or participating devices 120A-120N).

The measurement stage 255 may be any means such as a device that is configured to measure one entangled particle of entangled particle pairs. The measurement stage 255 may receive the entangled particles delayed by the delay stage 251. The measurement stage 255 may include one or more preprocessing devices 256 and a single particle measurement device 257. Particles received by the measurement stage 255 may be impinged on the preprocessing devices 256. The one or more preprocessing devices 256 may perform any optical function (e.g., filtering, polarizing, polarization filtering, etc.) in preparation for measurement of the particles. In one embodiment, a preprocessing device 256 filters out particles that do not have a particular polarization such that only particles having the particular polarization impinge on the single particle measurement device 257. The single particle measurement device 257 may measure particles that impinge on it. The single particle measurement device 257 may be configured to only measure particles from the one or more preprocessing devices 256. For example, single particle measurement device 257 may be shrouded and/or optically coupled to the one or more preprocessing devices 256. Consequently, the single particle measurement device 257 may only count particles that have the particular polarization. The single particle measurement device 257 may be implemented using single-particle detectors such as, for example, biased semiconductor junctions, superconducting wires, nanowires, and/or other types of devices.

Entangled particles may be generated by the entangled particles generation hardware 210 at a predetermined rate. The aforementioned rate may be used to determine, for different points in time, the value of bits of a bit sequence corresponding to the different points in time. For example, detection of a particle by the single particle measurement device 257 during a period of time (e.g., when a particle of an entangled particle pair is expected to arrive at the single particle measurement device) may be treated as the value of a bit being a "1" whereas not detecting a particle during the period of time may be treated as the value of the bit being a "0". Thus, the combination of preprocessing devices and single particle measurement device may provide for counting of photons having a particular polarization and not counting particles having other polarizations.

The measurement basis controller 260 may be any means such as a device that is configured to modify the basis used to measure particles. To appropriately measure pairs of entangled particles, information regarding the generation basis may need to be known. For example, the launch angle along a transmission medium may need to be known to set a corresponding measurement angle from the transmission medium. If not properly set, the particles may not be detectable. The measurement basis controller 260 may include, for example, a controller 261 and one or more actuators 262. The actuators 262 may be positioned to modify the positioning and/or orientation of the preprocessing devices 256 and/or transmission mediums with respect to one another. The actuators 262 may be operably connected to the controller 261 such that the controller 261 may operate the actuators 262 to modify the positioning and/or orientation of the aforementioned components. Information regarding the generation and measurement basis may be stored, for example, in a storage device. Similar information may be stored in corresponding participating device repositories.

Turning to FIG. 2D, a diagram of example communications hardware 206 is illustrated. The communications hardware 206 may facilitate communications between apparatus 200 and other devices and distribution of an entangled particle of an entangled particle pair and/or secure key(s) to other devices (e.g., initiating devices 110A-110N and/or participating devices 120A-120N). As one example, the communications hardware 206 may comprise a fiber-optic cable that facilitates distribution of quantum data to other devices. In such embodiments, the fiber-optic cable may connect to another device in order to transmit quantum data between the devices. In some such embodiments, the fiber-optic cable may be a retractable fiber-optic cable to improve the convenience of transporting the QKD device 102 when not connective to another device. As another example, the communications hardware may include a laser port that facilitates distribution of the quantum data. In this regard, in some embodiments, the QKD device 102 may also include a mechanism for assisting with an alignment of the laser port of the QKD device 102 with a corresponding laser port of an initiating device 110A-110N or participating device 120A-120N. Other implementations of the communications hardware 206 may utilize still other componentry suitable for delivering quantum data from the QKD device 102 to another device. In some embodiments, multiple connection modalities may be included in the QKD device 102 to permit greater interoperability with a variety of devices.

Although components 202-212 are described in part using functional language, it will be understood that the particular implementations necessarily include the use of particular hardware. It should also be understood that certain of these components 202-212 may include similar or common hardware. For example, the entangled particles generation hardware 210 and secure key generator 212 may each at times leverage use of the processor 202, memory 204, communications hardware 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "generator," with respect to elements of the apparatus therefore shall be interpreted as necessarily including the particular hardware configured to perform the functions associated with the particular element being described. Of course, while the terms "circuitry" and "generator," should be understood broadly to include hardware, in some embodiments, these terms may in addition refer to software instructions that configure the hardware components of the apparatus 200 to perform the various functions described herein.

Although the entangled particles generation hardware 210 and secure key generator 212 may leverage processor 202, memory 204, communications hardware 206, or input-output circuitry 208 as described above, it will be understood that these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications hardware 206 or input-output circuitry 208 for enabling any functions not performed by special-purpose hardware elements. In all embodiments, however, it will be understood that the entangled particles generation hardware 210 and secure key generator 212 are implemented via particular machinery designed for performing the functions described herein in connection with such elements of apparatus 200.

Figure 3:
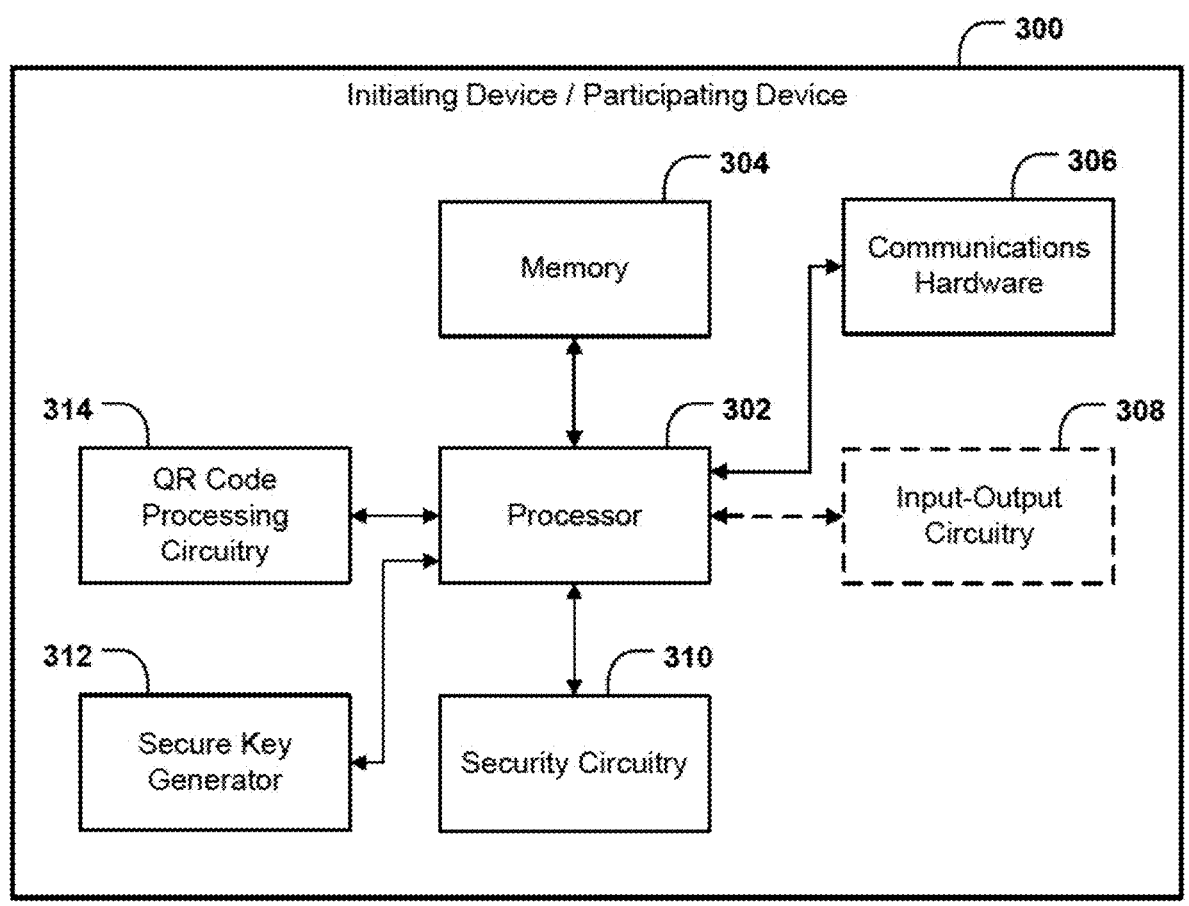
FIG. 3 illustrates a schematic block diagram of example circuitry embodying an initiating device or a participating device that may perform various operations in accordance with some example embodiments described herein.

As illustrated in FIG. 3, an apparatus 300 is shown that represents an example initiating device (e.g., any of first devices 110A-110N) or an example participating device (e.g., any of participating devices 120A-120N). The apparatus 300 includes processor 302, memory 304, and communications hardware 306, secure key generator 312, and may optionally include input-output circuitry 308, each of which is configured to be similar to the similarly named components described above in connection with FIGS. 2A-2D. In addition, the apparatus 300 includes security circuitry 310, and QR code processing circuitry 314, which are described below.

Security circuitry 310 is configured to generate a secure character string for use in a QR code, by applying a data protection mechanism to a payload based on a key known to the apparatus 300, and in some cases also through the injection of a control set into the payload, the control set comprising a series of controls governing applicability of a QR code. The security circuitry 310 is further configured to verify authenticity of a QR code generated based on a key and, where applicable, also based on a control set. The security circuitry 310 may utilize processor 202, memory 204, or any other hardware component included in the apparatus 300 to perform these operations, as described in connection with FIGS. 4-6C below. The security circuitry 310 may further utilize communications hardware 306 to gather data from a variety of sources (e.g., a QKD device, as shown in FIGS. 1A and 1B), and may utilize input-output circuitry 308 to exchange data with a user.

The apparatus 300 further comprises QR code processing circuitry 314 that is configured to identify a payload to be encoded in a QR code, and create the QR code using a character string (e.g., a secure character string generated by security circuitry 310). The QR code processing circuitry 314 is further configured to extract a character string from a QR code (where the extracted character string may be a secure character string generated by security circuitry 310 of the apparatus 300 or another apparatus). The QR code processing circuitry 314 may utilize processor 202, memory 204, or any other hardware component included in the apparatus 300 to perform these operations, as described in connection with FIGS. 4-6C below. The QR code processing circuitry 314 may further utilize communications hardware 306 to gather data from a variety of sources (e.g., a QKD device, as shown in FIGS. 1A and 1B), and may utilize input-output circuitry 308 to exchange data with a user.

In some embodiments, various components of the apparatus 300 may be hosted remotely (e.g., by one or more cloud servers) and thus need not physically reside on the corresponding apparatus 300. Thus, some or all of the functionality described herein may be provided by third party circuitry. For example, apparatus 300 may access one or more third party circuitries via any sort of networked connection that facilitates transmission of data and electronic information between the apparatus 300 and the third party circuitries. In turn, that apparatus 300 may be in remote communication with one or more of the other components described above as comprising the apparatus 300.

As will be appreciated based on this disclosure, example embodiments contemplated herein may be implemented by an apparatus 200 configured to engage with a variety of apparatuses 300. Furthermore, some example embodiments may utilize one or more computer program product comprising software instructions stored on at least one non-transitory computer-readable storage medium (e.g., memory 204 or 304) that, when executed, cause execution of the functionality of various components of a respective apparatus 200 or 300. Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2A or apparatus 300 as described in FIG. 3 that loading the software instructions onto a computing device or apparatus produces a special-purpose machine comprising the means for implementing any corresponding functions described herein.

Having described specific components of example apparatuses 200 and 300, example embodiments are described below in connection with a series of flowcharts.

Example Operations

Figure 4:
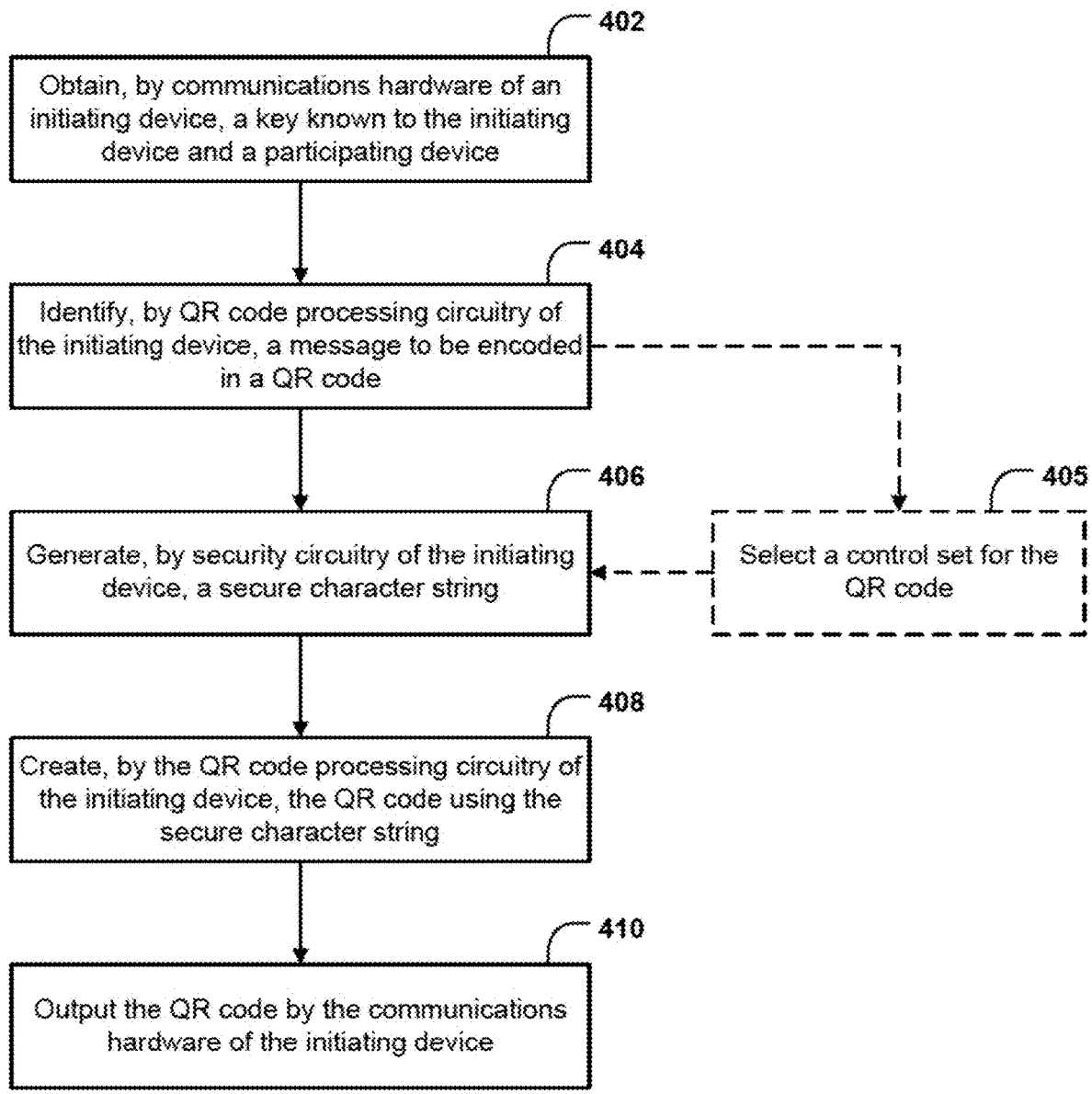
FIG. 4 illustrates an example flowchart for an initiating device to securely utilize QR codes, in accordance with some example embodiments described herein.
Figure 5:
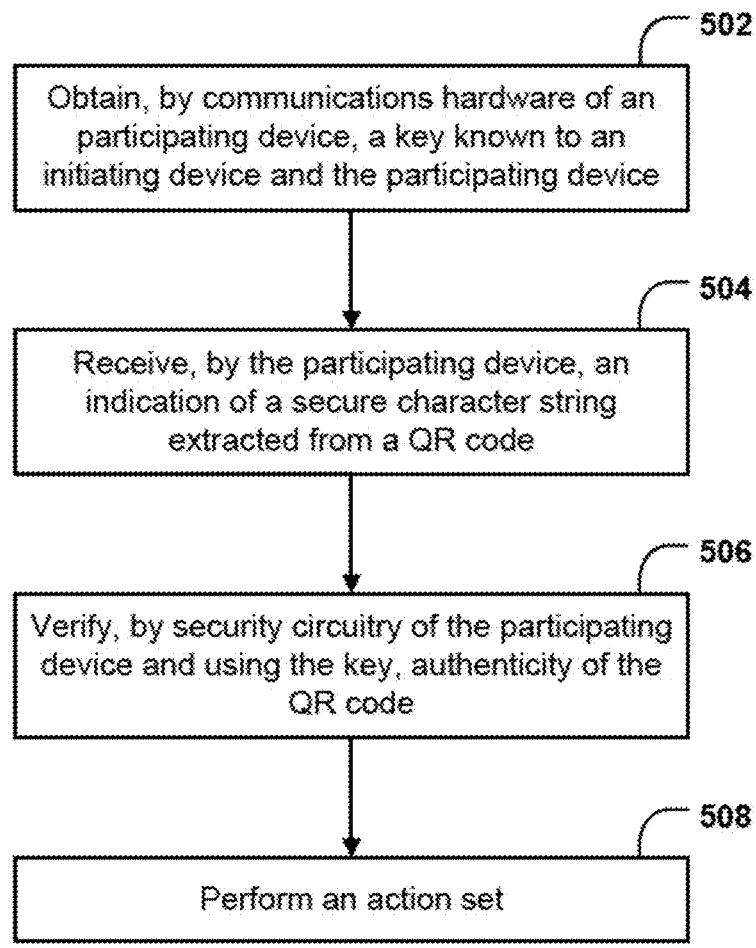
FIG. 5 illustrates an example flowchart for a participating device to securely utilize QR codes in accordance with some example embodiments described herein.

Turning to FIGS. 4 and 5, example flowcharts are illustrated that contain example operations for secure utilization of QR codes, as implemented by various embodiments described herein. The operations illustrated in FIG. 4 may, for example, be performed by an initiating device (e.g., one of initiating devices 110A-110N, as shown in FIG. 1A), which may in turn be embodied by an apparatus 300, which is shown and described in connection with FIG. 3. To perform the operations described below, the apparatus 300 may utilize one or more of processor 302, memory 304, communications hardware 306, input-output circuitry 308, security circuitry 310, QR code processing circuitry 314, and/or any combination thereof.

Turning first to FIG. 4, an initiating device may be performing the operations illustrated in the flowchart to securely utilize a QR code. More specifically, by preparing a QR code based on a secure character string, example embodiments enable a participating device that receives the QR code to verify authenticity of the QR code. In doing so, example embodiments engender trust in the use of QR codes that may be prone to fraud or other third party risks.

As shown by operation 402, the apparatus 300 includes means, such as memory 304, communications hardware 306, secure key generator 312, or the like, for obtaining a key known to the initiating device and a participating device. The key may be held in memory 304 of the apparatus 300 after having previously been obtained by the apparatus 300 or the key may be newly obtained via communications hardware 306. For instance, in some embodiments, the apparatus 300 may generate the key for immediate use in the operations described below or may store the key in memory 304 for later utilization.

In some embodiments, the key comprises a pseudorandom number generated using known pseudorandom number generation techniques and distributed among both the apparatus 300 and another device using a secure key distribution protocol (e.g., public key encryption, BB84, B92, E91, or other QKD protocols, or other mechanisms).

However, in some embodiments the key comprises a truly random number. In such embodiments, the key may be a QRN obtained via measurement of entangled particles held by the apparatus 300 and by another device. In such cases, the entangled particles may in some embodiments be distributed by communications hardware 306 in the manner described previously in connection with FIG. 2D.

In an instance in which the key comprises a QRN, the apparatus 300 may obtain the key as follows. First, the communications hardware 306 may receive, from a QKD device 102, a set of particles entangled with a corresponding set of particles. The corresponding set of particles may be retained by the QKD device 102 in an instance in which the QKD device 102 comprises the participating device that will be able to verify authenticity of QR codes created by the apparatus 300. Alternatively, the corresponding set of particles may be transmitted by the QKD device 102 to a separate participating device. Thereafter, secure key generator 312 of the apparatus 300 may measure a state of the set of particles to obtain the QRN comprising the key.

The QKD device 102, which comprises an apparatus 200, includes means, such as processor 202, memory 204, entangled particles generation hardware 210, and/or the like, for generating a pair of entangled particles (to simplify explanation, reference is made to generation of a pair of entangled particles, but it should be appreciated that the entangled particles generation hardware 210 may be utilized to generate a stream of entangled particles (e.g., sets of entangled particles)). In some embodiments, the entangled particles generation hardware 210 of the QKD device 102 is utilized to generate the pair of entangled particles (e.g., as described above with reference to FIG. 2B). The QKD device 102 further includes communications hardware 206 for transmitting a first particle of the pair of entangled particles to the apparatus 300 via a first connection between the QKD device 102 and the apparatus 300. The second particle of the pair of entangled particles may correspondingly be delivered to a corresponding participating device, or may be retained within the QKD device 102 (e.g., through its transmission into a delay stage 251 of secure key generator 220), in embodiments where the QKD device 102 itself comprises the participating device.

Again, while discussed for ease of description in terms of a single pair of entangled parties, various embodiments may utilize multiple pairs of entangled particles, such that for each pair of entangled particles generated, a first particle of a respective pair of entangled particles is delivered to the apparatus 300 (e.g., the initiating device) and the second particle of the respective pair is delivered to the participating device (or retained where the QKD device 102 is the participating device). In this fashion, an arbitrarily long sequence of entangled particles may be obtained by the apparatus 300, wherein the length of the sequence may be selected based on the desired size of the key to be used.

In some embodiments, the apparatus 300 may include components enabling it to play the role of the QKD device 102, and thus the apparatus 300 may perform the operations to generate entangled particles and share them with a separate participating device to facilitate mutual obtaining of the QRN. Regardless, upon measurement of the entangled particles by either the apparatus 300 (e.g., the initiating device) or the participating device, both devices will obtain the QRN.

In an instance in which the key comprises a QRN but the apparatus 300 is not quantum-enabled, the QRN may be received directly from the QKD device after the QKD device 102 has used a secure key generator to create the QRN. The obtained QRN may be stored in a repository (e.g., memory 304) for future use, along with, for example, timestamp data (e.g., a trusted timestamp), ordering data, and/or other information such that the initiating device and participating device may cooperatively use the QRN. With regard to the timestamp data, the QRN (or the secure character string used to create a QR code) may be hashed, sent to a timestamp authority (TSA) that generates a Time Stamp Token (TST) using its private key. The TST may thereafter be verified by either the initiating device or the participating device using the QRN. The TST may be pre-allocated to a URL that can thereafter be encoded within a QR code reliant upon the QRN. To do this, upon generation of the TST, the site to which the URL navigates may then be updated to include the TST, such that the pre-allocated URL for the QR code will direct a browser to the actual TST, thereby enabling both the initiating device and participating device to verify the TST.

In some embodiments, the key need not comprise a QRN, but may utilize classical key exchange techniques such that the apparatus 300 and the participating device both securely obtain the key with a high degree of confidence that unauthorized third parties are not able to obtain the key. In such embodiments, the key may be generated using classical techniques, such as public key cryptography, and in some such embodiments, the key may even be hosted by a third party (e.g., a certificate authority).

As shown by operation 404 the apparatus 300 includes means, such as QR code processing circuitry 314, or the like, for identifying a payload to be encoded in a QR code. The payload may be provided to the apparatus 300 by a user via input-output circuitry 308 or the payload may be provided to the apparatus 300 by a separate device. The payload may be pre-stored by the apparatus 300, or may alternatively be constructed by an application running on the apparatus 300 (e.g., any of a number of application layer "apps" hosted by the apparatus 300). The payload may comprise instructions for execution by a device. For instance, where the payload is constructed by a payment application running on the apparatus 300, the payload may include instructions to utilize identified payment credentials. As another example, where the payload is constructed by a merchant application running on the apparatus 300, the payload may include instructions to navigate to a particular URL associated with the merchant's website.

In some embodiments, the procedure may advance, following completion of operation 404, to optional operation 405 for selection of a control set prior to generation of a secure character string in operation 406. In other embodiments, a control set may not be necessary and the procedure may advance directly to operation 406, which is described below.

Turning to operation 405, the apparatus 300 may include means, such as security circuitry 310 or the like, for selecting a control set for the QR code. The security circuitry 310 may select the control set based on the sensitivity of the information and/or instructions included in the payload to be transmitted using the QR code. For instance, if the QR code includes payment credentials or other personally identifying information (PII), the security circuitry 310 may select one or more controls to include in a control set that will be injected into the payload to mitigate risk of improper utilization of the information contained in the QR code.

The control set may include a time-to-live (TTL) control defining an expiration date of the QR code. Additionally, or alternatively, the control set may include a service subscriber name control defining an entity that may utilize the QR code. As yet other additional or alternative elements, the control set may include a service provider name control defining an entity associated with utilization of the QR code, and/or may include an intended purpose control defining a set of authorized uses of the QR code. The purpose of the control set is to place contextual limits on the authorization of a QR code. For instance, if a QR code provides authorization to utilize certain payment credentials, a TTL control may limit the authorization to a predefined period of time that will limit the potential for future fraud based on a malicious actor stealing the QR code. Similarly, including a service subscriber name control limits the potential for such third parties to utilize the QR code to pay for services for non-named individuals. Including a service provider name control also limits risk that the QR code will be used to purchase or redeem products or services from other vendors, and including an intended purpose control limits the scope of products or services for which the QR code may authorize payment even from an authorized vendor.

Finally, in some embodiments, the control set may also include information uniquely identifying an authorized QR code bearer, such as biometric data associated with the authorized QR code bearer. Because the key can be used by the participating device to verify that the QR code was generated by the initiating device, inclusion of uniquely identifying information of the authorized QR code bearer can enable the participating device to securely verify, via evaluation of the uniquely identifying information, not only that the QR code is authorized, but also that it is being presented by an authorized entity.

If a control set is selected, the operation will nevertheless subsequently proceed to operation 406 for generation of a secure character string. However, although operation 406 takes place whether or not a control set is selected by the apparatus 300, it will be understood that the generation of a secure character string may be based in part on a control set in an instance in which a control set is selected. For instance, prior to generating the secure character string, the security circuitry 310 may inject data indicative of the control set into the payload, such that operation 406 is based on the control set in addition to the original payload identified by the apparatus 300.

As shown by operation 406, the apparatus 300 includes means, such as security circuitry 310 or the like, for generating, based on the payload and the key, a secure character string. For instance, generating the secure character string may include applying, by the security circuitry of the initiating device, a data protection mechanism to the payload using the key to produce the secure character string. More specifically, applying the data protection mechanism may include encrypting the payload using the key, such that only the participating device can decrypt the payload. To this end, if the key is a QRN (or a key generated using a commonly held QRN as a seed), then as a symmetric key both the initiating device and the participating device will encrypt and decrypt the message using the same key. However, the data protection mechanism may include encrypting the payload using public key cryptography, in which the security circuitry 310 may utilize the public key of the participating device to encrypt the payload and create the secure character string, which in turn means that the only way to decrypt and interpret the secure character string is using the private key of the participating device, which presumably only the participating device will have. Alternatively, the security circuitry 310 may digitally sign the payload, such that the security circuitry 310 uses the private key of the apparatus 300 (e.g., the initiating device), and any other device may utilize the public key to verify that the secure character string was generated by the apparatus 300. As yet another alternative, signcryption may be used, in which the security circuitry 310 signs the payload using the private key of the apparatus 300 and encrypts the payload using the public key of the participating device (these operations may be done in sequence, or in some cases may even be done concurrently).

When using digital signatures in this fashion, it will be understood that legacy public key approaches may be used (e.g., Rivest-Shamir-Adleman (RSA) or Diffie-Hellman key exchange), but other post-quantum cryptographic (PQC) approaches may also be used (e.g., Classic McEliece, CRYSTALS-KYBER, etc.). Furthermore, the security circuitry 310 may secure timestamp the payload or a portion of the payload using the QRN.

While in some cases the entire payload will be secured using one of these data protection mechanisms, in other cases only a portion of the payload will be secured. Moreover, when using a digital signature, a portion of the payload may be digitally signed, and the signature may also be embedded within the secure character string. And in some implementations, the data protection mechanism may utilize a Cryptographic Message Syntax (CMS) detached signature locatable via a URL that is embedded within the secure character string (and thus locatable via the resulting QR code).

As another example, the data protection mechanism may include steganographically embedding the key in the payload, such that a participating device may be able to identify the key from the secure character string, thereby enabling the participating device to verify that the QR code was created by the initiating device. Because only the initiating and participating devices know the key, no other device can determine whether the key has been embedded in the payload. In some embodiments rather than embedding the key in a payload, the data protection mechanism may embed a message authentication code (MAC) or hash-based message authentication code (HMAC). In these scenarios, the key (or MAC or HMAC) may be included in selected bits within the secure character string (e.g., the $4^{th}$ bit, $11^{th}$ bit, $25^{th}$ bit, etc.), with the pattern of bit encoding being stored at another secure location accessible via a URL encoded within the secure character string, thus adding another layer of security. As another permutation, some implementations may utilize the key to select the pattern by which bits of a second key are encoded. This second key may also be known to the initiating device and the participating device, but perhaps also a larger group including the initiating and participating devices, such as all entities associated with a particular organization. The second key may be received by the initiating device and the participating device independently from the first key, and may be received via quantum methods such as described herein, or using classical key exchange techniques). In this fashion, the key enables identification of the bit locations within the secure character string corresponding to the second key, and the initiating device and participating device may thus embed and reproduce the second key, which may be used for verification of QR code authenticity.

As shown by operation 408 the apparatus 300 includes means, such as QR code processing circuitry 314 or the like, for creating, by the QR code processing circuitry of the initiating device, the QR code using the secure character string. Generation of QR codes from a character string is a well-understood process, and the QR code processing circuitry may deploy traditional techniques for performing this step, with the important distinction being that the character string used to create the QR code is a secure character string generated in the manner described previously in connection with operations 402-406.

Finally, as shown by operation 410 the apparatus 300 includes means, such as communications hardware 306 or the like, for outputting the QR code by the communications hardware of the initiating device. In some embodiments, outputting the QR code includes transmitting the QR code to the participating device directly. This may occur where the apparatus 300 (e.g., the initiating device) is physically proximate to the participating device. For instance, where a user's smartphone is the initiating device within a retail location of a merchant, and a retail location device is the participating device, the retail location device may be used to scan the QR code directly from the user's smartphone. In other embodiments, however, outputting the QR code may involve transmitting the QR code to an intermediary device, wherein the participating device receives an indication of the secure character string via the intermediary device. For instance, in the same retail example, the retail location device may merely be an intermediary device, which may relay the QR code to the participating device, which may be located in a secure area of the retail location. In yet another embodiment, a remote device may comprise the participating device. In such scenarios, the retail location device may be used to scan the QR code directly from the user's smartphone, and may transmit indicia of the QR code (e.g., either the QR code itself, or the secure character string extracted from the QR code) and may forward that indicia to the participating device for authentication and utilization of the QR code.

Turning next to FIG. 5, example operations are shown that may be performed by a participating device to securely utilize a QR code. More specifically, by receiving a QR code prepared by an initiating device based on a secure character string, example embodiments enable the participating device to verify that the QR code originated from the initiating device. In doing so, example embodiments enhance trust in QR codes that may be prone to fraud or other third party risks.

As shown by operation 502 the apparatus 300 includes means, such as memory 304, communications hardware 306, secure key generator 312, or the like, for obtaining, by communications hardware of a participating device, a key known to an initiating device and the participating device. For instance, communications hardware 306 of the participating device may obtain, from a QKD device, a set of particles entangled with a corresponding set of particles held by the initiating device, and secure key generator 312 of the participating device may measure a state of the set of particles to obtain a QRN comprising the key. Further detail regarding how the apparatus 300 comprising the participating device obtains the key are omitted because this operation parallels that of operation 402.

As shown by operation 504 the apparatus 300 includes means, such as communications hardware 306, input-output circuitry 308, QR code processing circuitry 314, or the like, for receiving, by the participating device, an indication of a secure character string extracted from a QR code. For instance, communications hardware 306 may receive the QR code directly from the initiating device or an intermediary device. Subsequently, QR code processing circuitry 314 may extract the secure character string from the QR code. In another example, communications hardware 306 may receive the secure character string from an intermediary device, wherein the intermediary device or another intermediary device has previously extracted the secure character string from the QR code. In another example, a user may provide the QR code or the secure character string to the apparatus 300 via input-output circuitry 308.

As shown by operation 506 the apparatus 300 includes means, such as security circuitry 310 or the like, for verifying authenticity of the QR code using the key. For instance, the security circuitry 310 may confirm that the secure character string was protected using the key. To this end, verifying that the secure character string was protected using the key may include decrypting the secure character string using the key to produce a payload, verifying a digital signature applied to the payload or a portion of the payload, verifying a secure timestamp applied to the payload or a portion of the payload, or locating, in the secure character string, the key or a message authentication code derived from the key. The digital signature or timestamp may be verified via a CMS detached signature locatable via a URL embedded in the secure character string. Any other suitable verification operation may be used for verification that corresponds to the data protection mechanism applied to generate the secure character string, which may be pre-shared between the initiating device and the apparatus 300 (e.g., the participating device). Verifying the authenticity of the QR code may further include the security circuitry 310 generating a payload and a control set from the secure character string, evaluating whether every control in the control set is satisfied, and outputting an indication of whether every control in the control set is satisfied. As noted previously, the control set may include one or more of: (1) a TTL control defining an expiration date of the QR code, (2) a service subscriber name control defining an entity that may utilize the QR code, (3) a service provider name control defining an entity associated with utilization of the QR code, (4) an intended purpose control defining a set of authorized uses of the QR code, or (5) information uniquely identifying an authorized QR code bearer.

Finally, as shown by operation 508 the apparatus 300 includes means, such as processor 302, memory 304, communications hardware 306, input-output circuitry 308, security circuitry 310, QR code processing circuitry 314, or the like, for, in response to verifying the authenticity of the QR code, performing an action set. Performing the action set may include executing, by processor 302, an instruction set included in the payload. In an instance in which verifying that the secure character string was protected using the key comprises decrypting the secure character string using the key, performing the action set may include the communications hardware 306 transmitting the payload to an intermediary device. In an instance in which verifying that the secure character string was protected using the key comprises locating the key in the secure character string, performing the action set may include the communications hardware 306 transmitting a verification confirmation message to an intermediary device.

FIGS. 4 and 5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Operations

Figure 6A:
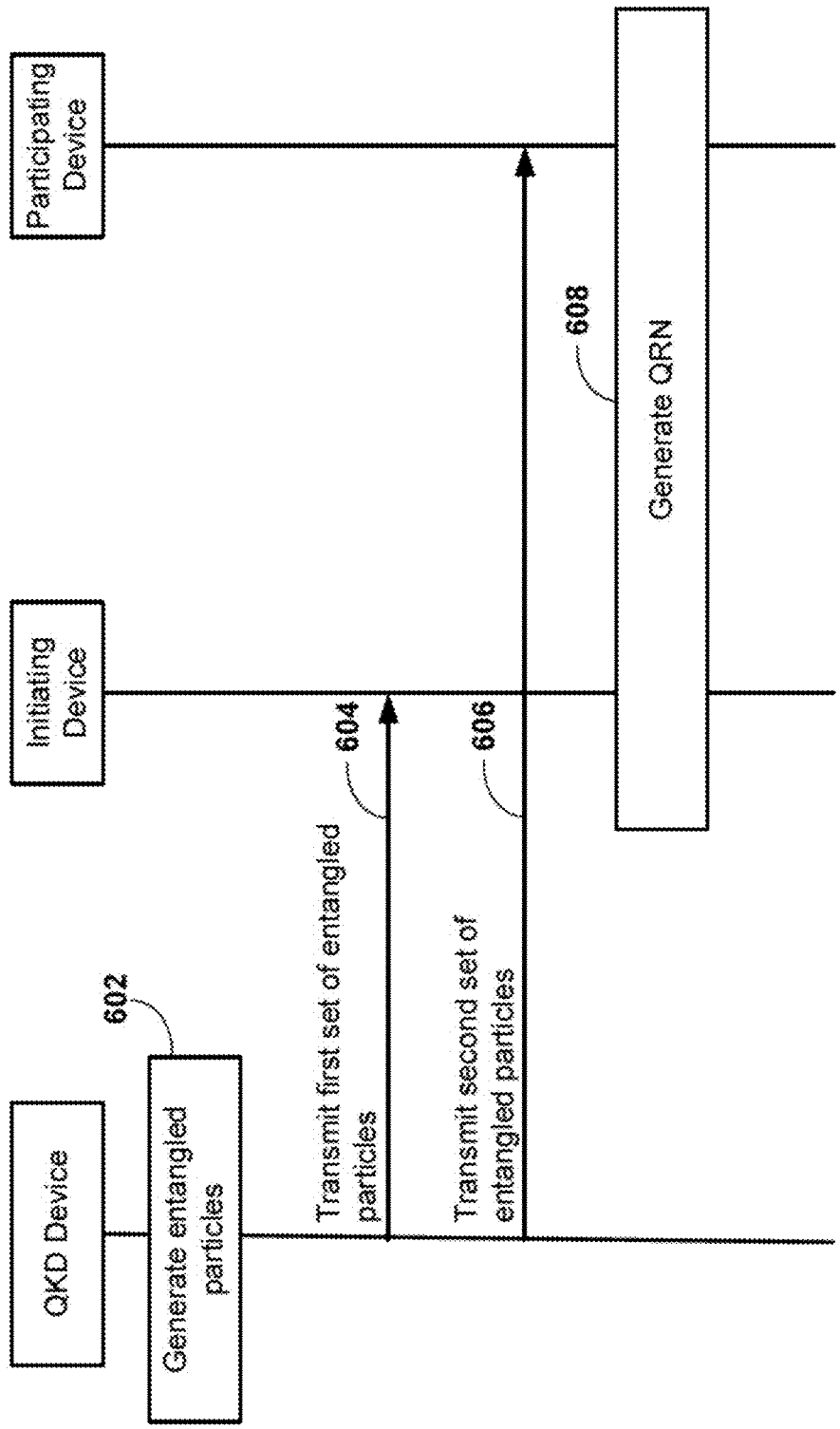
FIGS. 6A-6C illustrate example operations of a system, in accordance with some example embodiments described herein.
Figure 6B:
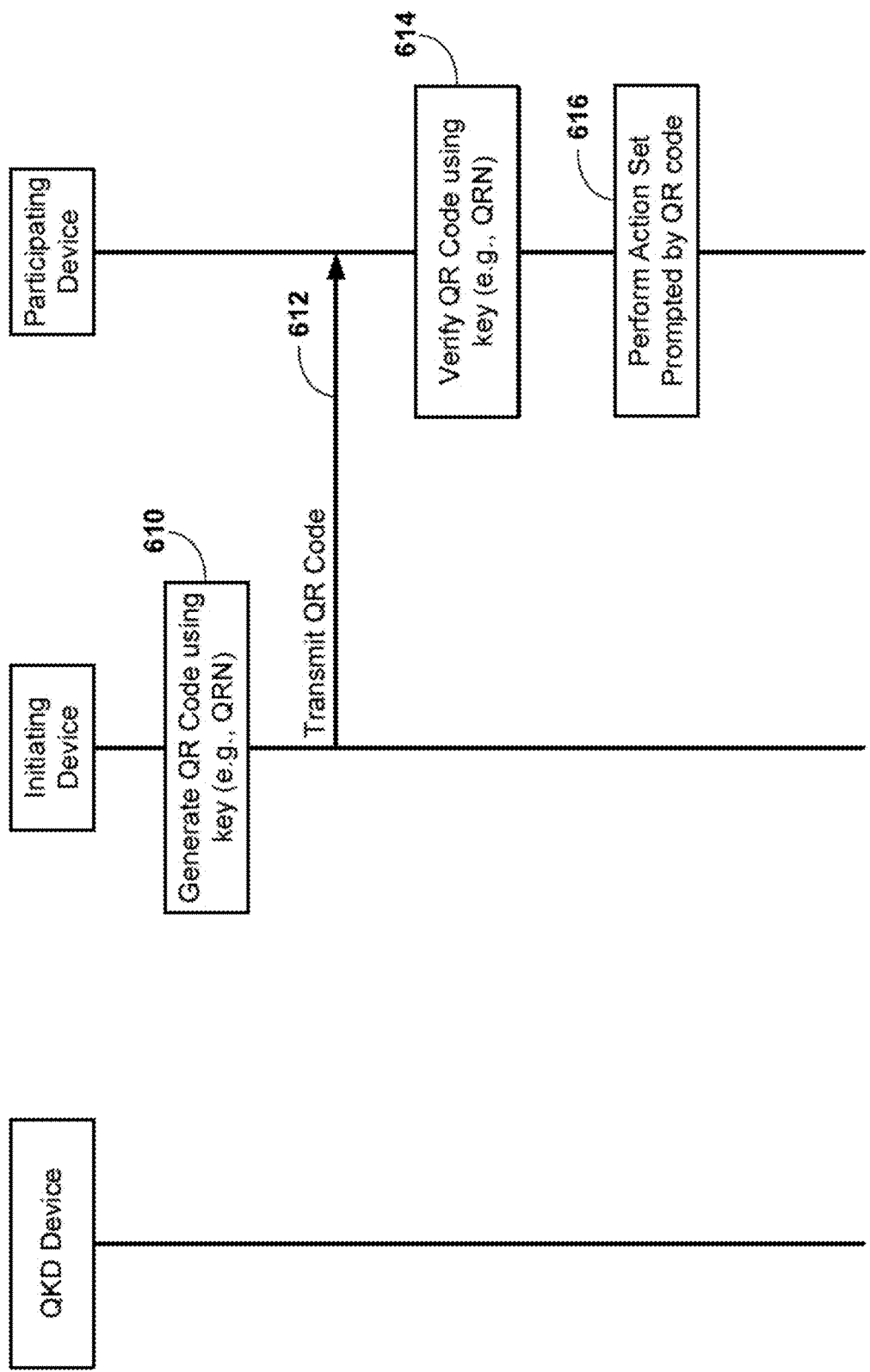
Figure 6C:
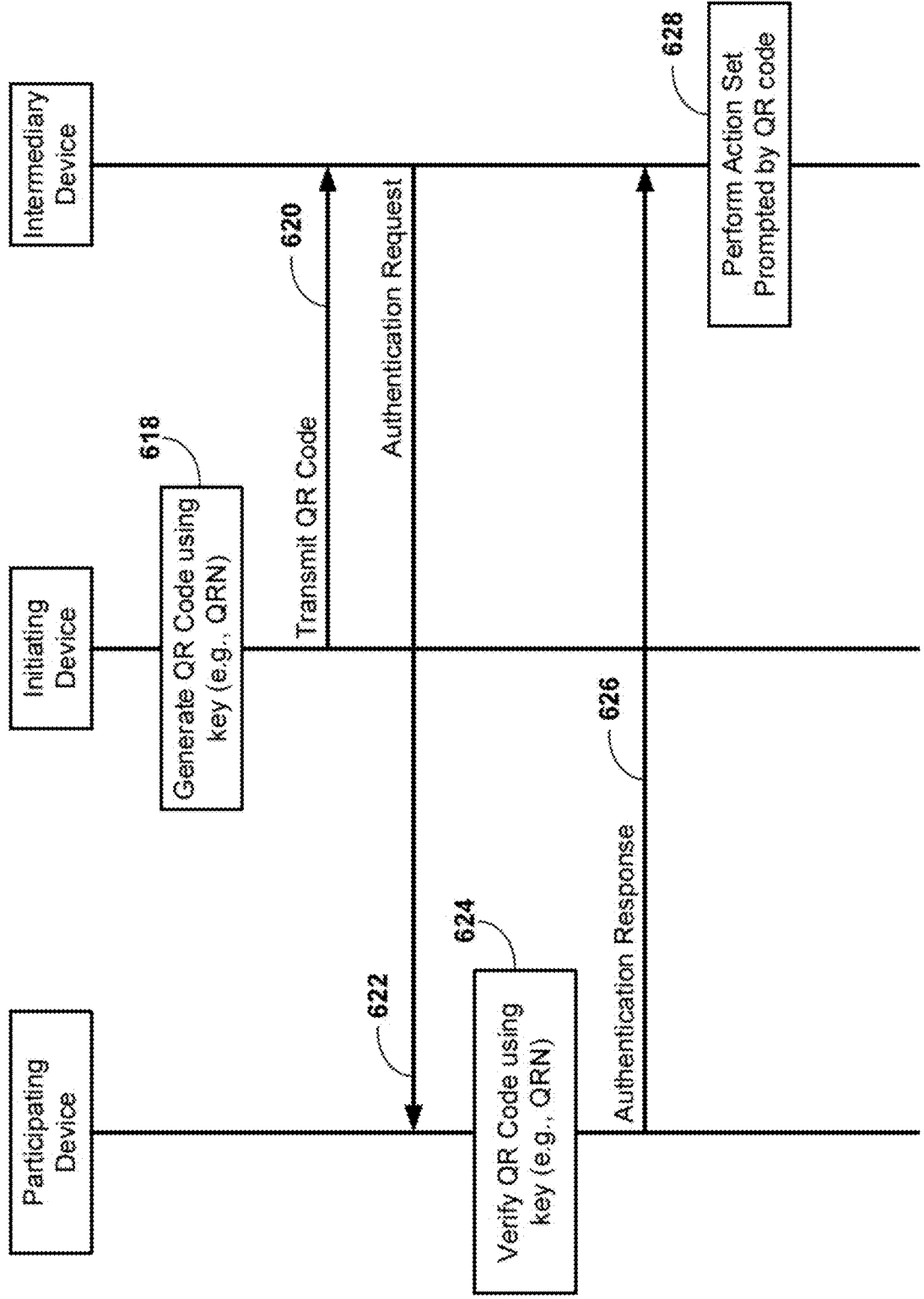

As noted above, initiating devices and participating devices may utilize mutually shared keys to securely utilize QR codes. FIGS. 6A-6C show swim lane diagrams illustrating example operations performed by components of a distributed system to produce various benefits from example embodiments. In these figures, operations performed by a QKD device 102 are shown along the line extending from the box labeled "QKD device", operations performed by an initiating device (e.g., one of initiating devices 110A-110N) are shown along the line extending from the box labeled "initiating device", operations performed by a participating device (e.g., one of participating devices 120A-120N) are shown along the line extending from the box labeled "participating device", and operations performed by an intermediary device are shown along the line extending from the box labeled "intermediate device". An intermediate device, in this regard, may be any device that is capable of receiving and transmitting QR codes and/or information about QR codes. Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

Turning first to FIG. 6A, at operation 602, a QKD device generates a series of entangled particles including a first set for an initiating device and a second set for a participating device. After generation of the entangled particles, at operations 604 and 606, the first set of particles is sent to the initiating device at operation 604, and second set of particles (each of which is entangled with a corresponding particle in the first set) is sent by the QKD device to the participating device via communications hardware 206. Subsequently, the initiating device and the participating device may mutually generate a quantum random number at operation 608. Upon the first of these devices to measure the states of its respective set of entangled particles, the entanglement between the sets of particles will collapse and produce a QRN known only to the initiating device and the participating device. Accordingly, either device measuring its set of particles will produce the commonly held QRN, which both devices may thereafter use for secure QR code utilization.

The operation 602-608 may be performed, for example, in accordance with a plan for secure distribution of QR codes, in response to a request for a request for secure utilization of a QR code from one of these devices, or in other manners. By distributing the quantum random number to these devices, each of these devices may use the quantum random number to perform subsequent processes such as authentication and/or securing of QR code interactions. It will be understood that, although FIG. 6A describes the exchange of entangled particles as a mechanism for generating a QRN, other methods may be used to generate and/or exchange keys between the initiating device and the participating device. For instance, a random number may be generated by the QKD device and transmitted to the initiating device and the participating device via public key cryptography, a QKD approach (BB84, E91, or the like), or otherwise. Alternatively, a pseudorandom number may be generated instead. Similarly, while described using a QKD device that is distinct from both the initiating device and the participating device, the QKD device may, in some implementations, comprise one or another of these devices, such that the device including the QKD device need only transmit the random or pseudorandom number to the other one of these devices.

Turning to FIG. 6B, at operation 610, the initiating device begins the secure QR code utilization process by generating a QR code using a key (e.g., in this case the QRN generated as noted above, although as described previously the key may be generated and exchanged between the initiating device and participating device in a variety of ways). Having generated a QR code, the initiating device thereafter sends the QR code to the participating device at operation 612. At operation 614, the participating device can perform an authentication of the QR code using its key (e.g., the QRN). At operation 616, the participating device may thereafter perform an action set based on the outcome of the verification operation 614.

If the participating device verifies authenticity of the QR code in operation 614, then at operation 616 the participating device may navigate a browser to a URL identified in the QR code, automatically open a native app and perform a function indicated in the QR code (e.g., process a transaction using payment credentials identified in the QR code), present information identified in the QR code, or the like.

Otherwise, the participating device may treat the initiating device as being suspect and not provide it with sensitive data. For instance, if the participating device cannot verify that the QR code is authentic in operation 614, then at operation 616 the participating device may prevent utilization of the QR code. Furthermore, the participating device may display an error message and/or transmit a failure message to the initiating device or a third party administrator device.

Turning to FIG. 6C, a scenario is illustrated where the initiating device and participating device may interact via an intermediary device. At operation 618, the initiating device begins the secure QR code utilization process by generating a QR code using a key (e.g., the QRN generated as noted above). Having generated a QR code, the initiating device thereafter sends the QR code to an intermediary device at operation 620. At operation 624, the participating device performs a verification operation of the QR code using its key (e.g., the QRN). Subsequently, at operation 626, the participating device transmits an authentication response back to the intermediary device. Finally, at operation 628, the intermediary device may thereafter perform an action set based on the received authentication response from the participating device.

For instance, if the participating device verifies authenticity of the QR code in operation 614, then at operation 616 the intermediary device may navigate a browser to a URL identified in the QR code, automatically open a native app and perform a function indicated in the QR code (e.g., process a transaction using payment credentials identified in the QR code), present information identified in the QR code, or the like. Otherwise, the participating device may treat the initiating device as being suspect, not provide it with sensitive data, may prevent utilization of the QR code, may display an error message and/or may transmit a failure message to the initiating device or a third party administrator device (thereby limiting completion of any subsequent operations that may be reliant on utilization of the QR code).

While a single intermediary device is shown in FIG. 6C for ease of illustration, there may be any number of intermediary devices involved in the procedure. For instance, a first intermediary device may receive the QR code and transmit it to a second intermediary device, which may relay the QR code to a third intermediary device, and so forth. Moreover, additional complexity may be involved in the multiparty transmission of data. For instance, although a first intermediary device may receive the QR code and transmit an authentication request, a second intermediary device may ultimate be the device that will perform the action set based on the authentication response. For instance, the first intermediary device may, at operation 628, transmit an instruction to the second intermediary device to perform the action set. Alternatively, the authentication request sent at operation 622 may indicate that the second intermediary device should directly receive the authentication response at operation 626.

In some embodiments, some of the operations described above in connection with FIGS. 4-6C may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for secure utilization of quick response (QR) codes, the method comprising:
   obtaining, by communications hardware of an initiating device, a key known to the initiating device and a participating device;
   identifying, by QR code processing circuitry of the initiating device, a payload to be encoded in a QR code;
   prior to generating a secure character string for the QR code:
   selecting, by security circuitry of the initiating device and for the QR code, a control set comprising a series of controls that govern QR code applicability, wherein the selection of the control set is based on sensitivity of information included in the payload, and
   injecting, by the security circuitry of the initiating device, data indicative of the control set into the payload;
   generating, by the security circuitry of the initiating device, the secure character string based on the payload and the key, wherein at least a portion of the payload is secured using a data protection mechanism;
   encodinq, by the QR code processing circuitry of the initiating device and using an encodinq pattern derived from the key, a second key, wherein the key enables identification of a bit location corresponding to the second key within the secure character string;
   creating, by the QR code processing circuitry of the initiating device, the QR code using the generated secure character string; and
   outputting the QR code by the communications hardware of the initiating device.

2. The method of claim 1, wherein obtaining the key comprises obtaining the key via a quantum key distribution (QKD) device.

3. The method of claim 2, wherein obtaining the key comprises:
   obtaining, by the communications hardware of the initiating device and from the QKD device, a set of particles entangled with a corresponding set of particles held by the participating device, and
   measuring, by a secure key generator of the initiating device, a state of the set of particles to obtain a random number comprising the key.

4. The method of claim 1, wherein the control set includes one or more of:
   a time-to-live (TTL) control defining an expiration date of the QR code;
   a service subscriber name control defining an entity that may utilize the QR code;
   a service provider name control defining an entity associated with utilization of the QR code;
   an intended purpose control defining a set of authorized uses of the QR code; or
   information uniquely identifying an authorized QR code bearer.

5. The method of claim 4, wherein the information uniquely identifying the authorized QR code bearer includes biometric data.

6. The method of claim 1, wherein generating the secure character string includes:
   applying, by the security circuitry of the initiating device, a data protection mechanism to the payload using the key to produce the secure character string.

7. The method of claim 6, wherein applying the data protection mechanism comprises:
   encrypting, using the key, the payload or a portion of the payload;

digitally signing the payload or a portion of the payload;
secure timestamping the payload or a portion of the payload; or
embedding, in the payload, the key or a message authentication code derived from the key.

8. The method of claim 1, wherein outputting the QR code includes:
transmitting the QR code to the participating device; or
transmitting the QR code to an intermediary device, wherein the participating device receives an indication of the secure character string via the intermediary device.

9. An apparatus for secure utilization of quick response (QR) codes, the apparatus comprising an initiating device including:
communications hardware configured to obtain a key known to the initiating device and a participating device;
QR code processing circuitry configured to identify a payload to be encoded in a QR code; and
security circuitry configured to:
prior to generating a secure character string for the QR code:
select for the QR code a control set comprising a series of controls that govern QR code applicability, wherein the selection of the control set is based on sensitivity of information included in the payload; and
inject data indicative of the control set into the payload, and
generate the secure character string based on the payload and the key, wherein at least a portion of the payload is secured using a data protection mechanism,
wherein the QR code processing circuitry is further configured to:
encode, using an encoding pattern derived from the key, a second key, wherein the key enables identification of a bit location corresponding to the second key within the secure character string, and
create the QR code using the generated secure character string; and
wherein the communications hardware is further configured to output the QR code.

10. The apparatus of claim 9, wherein the communications hardware is configured to obtain the key via a quantum key distribution (QKD) device.

11. The apparatus of claim 10, wherein the communications hardware is configured to obtain the key by:
obtaining, from the QKD device, a set of particles entangled with a corresponding set of particles held by the participating device,
wherein the apparatus further includes a secure key generator configured to measure a state of the set of particles to obtain a random number comprising the key.

12. The apparatus of claim 9, wherein the control set includes one or more of:
a time-to-live (TTL) control defining an expiration date of the QR code;
a service subscriber name control defining an entity that may utilize the QR code;
a service provider name control defining an entity associated with utilization of the QR code;
an intended purpose control defining a set of authorized uses of the QR code; or
information uniquely identifying an authorized QR code bearer.

13. The apparatus of claim 12, wherein the information uniquely identifying the authorized QR code bearer includes biometric data.

14. The apparatus of claim 9, wherein the security circuitry is configured to generate the secure character string by:
applying a data protection mechanism to the payload using the key to produce the secure character string.

15. The apparatus of claim 14, wherein applying the data protection mechanism comprises:
encrypting, using the key, the payload or a portion of the payload;
digitally signing the payload or a portion of the payload;
secure timestamping the payload or a portion of the payload; or
embedding, in the payload, the key or a message authentication code derived from the key.

16. The apparatus of claim 9, wherein the communications hardware is configured to output the QR code by:
transmitting the QR code to the participating device; or
transmitting the QR code to an intermediary device, wherein the participating device receives an indication of the secure character string via the intermediary device.

17. A computer program product for secure utilization of quick response (QR) codes, the computer program product comprising at least one non-transitory computer-readable storage medium storing software instructions that, when executed, cause an initiating device to:
obtain a key known to the initiating device and a participating device;
identify a payload to be encoded in a QR code;
prior to generating a secure character string for the QR code:
select, for the QR code, a control set comprising a series of controls that govern QR code applicability, the QR code, wherein the selection of the control set is based on sensitivity of information included in the payload, and
inject data indicative of the control set into the payload;
generate the secure character string based on the payload and the key, wherein at least a portion of the payload is secured using a data protection mechanism;
encode, using an encoding pattern derived from the key, a second key, wherein the key enables identification of a bit location corresponding to the second key within the secure character string;
create the QR code using the generated secure character string; and
output the QR code.

18. The method of claim 1, wherein the method further comprises receiving,
by the communications hardware of the initiating device, the second key independently from the key.

19. The apparatus of claim 9, wherein the communications hardware is further configured to receive the second key independently from the key.

20. The computer program product of claim 17, wherein the software instructions, when executed, further cause the initiating device to receive the second key independently from the key.

* * * * *